United States Patent Office 3,574,736
Patented Apr. 13, 1971

3,574,736
METHOD FOR PREPARING HYDROXAMOYL CHLORIDES
Julius J. Fuchs, Forwood, Wilmington, Del., assignor to E. I. du Pont de Nemours and Company, Wilmington, Del.
No Drawing. Filed Dec. 16, 1966, Ser. No. 602,125
Int. Cl. C07c 131/00
U.S. Cl. 260—566
10 Claims

ABSTRACT OF THE DISCLOSURE

Chlorination of aldoximes, such as acetaldoxime, in 1% to 13% aqueous solutions and at a temperature of 25° C. to −15° C. to obtain the corresponding hydroxamoyl chlorides.

BACKGROUND OF THE INVENTION

This application relates to preparation of hydroxamoyl chlorides and more particularly is directed to the chlorination of acetaldoxime, methoxyacetaldoxime and propionaldoxime to produce the corresponding hydroxamoyl chloride.

The preparation of hydroxamoyl chlorides is disclosed for example in Ber. 35, 3101 (1902) by Piloty and Steinbock, who disclosed the preparation of acetohydroxamoyl chloride by the chlorination of acetaldoxime in dilute, aqueous HCl solution to produce 1,1-chloronitroso ethane, a blue oil, which dimerized to a white solid material. The dimer thus prepared was then dissolved in an organic solvent, diethyl ether, in which a rearrangement to the hydroxamic acid chloride took place in a time period of about twelve hours at room temperature.

Such a procedure for the preparation of the hydroxamoyl chloride was improved by Wieland as shown in Ber. 40, 1676 (1907). However, the prior art procedures all possess the disadvantage that the chlorination of the oxime in aqueous HCl solution produces to a large extent the monomeric and dimeric chloronitroso ethane, both of which are water insoluble and must be brought into solution of an organic solvent to facilitate the rearrangement to the hydroxamoyl chloride.

SUMMARY OF THE INVENTION

I have discovered that by chlorinating aldoximes of the formula

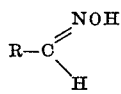

wherein R is methyl, methoxymethyl or ethyl, at a carefully controlled temperature and concentration, and by eliminating the presence of the HCl during the initial reaction phase, the desired hydroxyamoyl chloride is prepared without the necessity of rearrangement in an organic solvent resulting in a faster and more economical process.

Thus I have discovered that the formation of the monomeric and dimeric chloronitroso compounds is favored by chlorination of the oxime in aqueous solutions containing inorganic ions such as hydrogen, sodium, calcium, chlorine, and sulfate, and also by concentration of the oxime in the water in excess of 13%. Thus by preparing the desired hydroxamoyl chloride in aqueous solutions containing a minimum of the above inorganic ions and a concentration of oxime below 13%, production of the monomeric and dimeric chloronitroso compounds can be limited to trace amounts only.

Suitable aldoximes for use in the reaction of this invention are acetaldoxime, methoxyacetaldoxime, and propionaldoxime. Such aldoximes will be used in aqueous solutions in a concentration ranging from 1% to 13%. Preferably the concentration will range from 10% to 13% for reasons of economy and convenience.

The aldoximes will ordinarily be reacted with a stoichiometric quantity of chlorine, although amounts of chlorine used can of course vary slightly from stoichiometric such as plus or minus 2%. As will be well recognized by those skilled in the art, excess chlorine will ordinarily result in overchlorination and production of undesirable 1,1-dichloro-1-nitroso compounds and similarly a deficiency of chlorine will ordinarily cause under-chlorination and some unreacted oxime, neither of which results in a benefit to yield. It is preferable to decrease the rate of chlorine addition towards the end of the reaction to avoid a high chlorine concentration in the solution and the possibility of chlorinating the already formed hydroxamoyl chloride. The time required to introduce the chlorine is not critical but is ordinarily kept to a minimum. Thus the first 75% of the required chlorine can be introduced as fast as it can be absorbed, and the remaining chlorine should be introduced at ½ to ¼ the initial rate. In most circumstances it is desirable to keep chlorine addition time as low as is practical.

The temperature range during reaction can be from 25° C. to −15° C. For best yields it is preferable to operate as near the freezing point of the solution as possible. Thus under optimum operating conditions the temperature will ordinarily be near 0° C. at the beginning of the reaction and near −15° C. at the end of the reaction when the concentration of aldoxime is in the neighborhood of 13%. As lower chlorinating temperatures tend to improve yields, the presence of water-miscible organic solvents which depress the freezing point of the reaction mass also tend to improved yields. Any water-miscible organic solvent, which does not react with chlorine under reaction conditions of this invention, is suitable for use. Exemplary of suitable solvents are methanol, dioxane, and dimethyl formamide.

At the conclusion of chlorination the reaction mixture will ordinarily be held for a short period of time until any faint blue color present has largely disappeared. Normally such a hold time will be less than 30 minutes and will very seldom exceed one hour. The reaction mixture is then suitable for such use as is to be made of it. The hydroxamoyl chloride products of this invention are suitable for direct reaction with a sodium mercaptide to produce a thiolhydroxamate ester, which in turn is easily converted to a thiolhydroxamate carbamate as described in co-pending application Ser. No. 361,277, filed Apr. 20, 1964, now abandoned.

In the most preferred embodiment of the process of this invention, a 13% solution of acetaldoxime and water is cooled to −2° C. at which point solidification of the aldoxime due to freezing begins. Chlorine is then introduced, and as the chlorination progresses the temperature of the solution is gradually lowered without freezing to a temperature of −15° C. at the end of the chlorination period. The initially colorless solution of acetaldoxime and water will acquire a slight blue-green color during chlorination with the color increasing towards the end of the chlorination. Traces of solid dimeric chloronitroso ethane which forms early in the chlorination redissolves prior to the end of chlorination. In order to complete the rearrangement of the minor amounts of monomeric chloronitroso ethane, the reaction product is held for approximately 30 minutes at a temperature between −10° C. and 0° C. At the conclusion of this hold period the blue-green coloration of the solution has almost completely disappeared, and the hydroxamoyl chloride can be extracted and isolated or employed directly in the aqueous solution.

The following examples further illustrate the invention. Parts and percentages in these examples are by weight unless otherwise specified.

EXAMPLE 1

Twenty-nine and five tenths parts of acetaldoxime are dissolved in 200 parts of water and the solution is cooled to −2° C. Over a period of 25 minutes, 30 parts of chlorine are introduced to the solution with good agitation. During chlorine addition the temperature of the solution is gradually lowered to −10° C. At −10° C. 5.5 grams of chlorine are added in 10 minutes. The resulting blue solution is stirred slightly with cooling for 30 minutes during which time the blue color almost completely disappears from the reaction mass.

Repeated extraction with methylene chloride of the aqueous reaction product, followed by drying the combined extracts with $CaCl_2$ and evaporation of the methylene chloride at a temperature below 25° C. gives acethydroxamoyl chloride in 90% yield.

EXAMPLES 2–5

The following series of reactions demonstrate the effect of chlorination temperature on yield. Yields are measured by converting the acethydroxamoyl chloride into the hydroxamic acid thioester which is isolated and weighed.

In all of the reactions 29.5 parts of acetaldoxime is dissolved in 200 parts of water and is chlorinated at the indicated temperature with 30 parts of chlorine within 30 minutes followed by chlorination with 5.5 parts of chlorine within 10 minutes. The reaction mass is held at chlorination temperature and is agitated for 30 minutes after which it is cooled to −10° C. Two hundred and thirty parts of methylene chloride are then added to the cooled solution followed by 48 parts of methyl mercaptan which dissolves in the two-phase reaction medium. Approximately 80 parts of 50% sodium hydroxide solution are then added to the reaction mass while cooling at a temperature of between −10° C. and 0° C. with good agitation such that a pH of 7.5 is obtained. The reaction mass is then agitated while the temperature rises for 15 minutes. The lower layer is then separated and the upper layer is extracted twice with methylene chloride. The extracts are combined and dried by solvent evaporation and the thiolacetohydroxamic acid ester is recovered.

| Example Number | Chlorination temperature °C. | Parts of thiolhydroxamic ester | Yield of thiolhydroxamic ester |
|---|---|---|---|
| 2 | 20 | 37.6 | 71.6 |
| 3 | 10 | 39.5 | 75.3 |
| 4 | 0 | 42.5 | 80.8 |
| 5 | −2 to −10 | 43.8 | 83.5 |

EXAMPLE 6

Following the procedure of Example 1, a solution of 37 parts of propionaldoxime in 333 parts of water is prepared and is chlorinated with 35.5 parts of chlorine at a temperature just above the freezing point of the reaction mass. At the conclusion of the chlorine addition the reaction mass is held with agitation for 30 minutes at reaction temperature after which it is extracted with methylene chloride followed by drying and solvent evaporation as in Example 1. The product, propionohydroxamoyl chloride, is obtained in good yield.

EXAMPLE 7

Following the procedure of Example 1, a solution of 45 parts of methoxyacetaldoxime in 405 parts of water is prepared and chlorinated with 35.5 parts of chlorine just above the freezing point of the reaction mass. After chlorine addition is complete the reaction mass is held with agitation for 30 minutes at reaction temperature after which it is extracted with methylene chloride followed by drying and solvent evaporation as in Example 1. The product, methoxyacethydroxamoyl chloride, is obtained in good yield.

I claim:
1. In the process for preparing hydroxamoyl chlorides of the formula

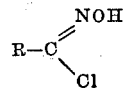

wherein R is methyl, ethyl, or methoxymethyl, by reaction of an aqueous solution of the corresponding aldoxime with chlorine, the improvement comprising carrying out the reaction at a temperature of between 25° C. and −15° C., said aldoxime being present in solution in an amount ranging from 1% to 13% by weight.

2. The process of claim 1 wherein the reactant aldoxime is acetaldoxime.

3. The process of claim 1 wherein the concentration of aldoxime in water is between 10% and 13% by weight.

4. The process of claim 1 wherein the reaction is followed by a hold time of from 1 to 30 minutes at reaction temperature.

5. The process of claim 1 wherein the reaction temperature is held between 0° C. and −15° C.

6. The process of claim 5 wherein reaction is commenced at a temperature between 0° C. and −2° C. and the temperature is lowered during reaction such that it is above the freezing point of the reaction mass and below −2° C.

7. The process of claim 5 wherein the concentration of aldoxime in water is between 10% and 13% by weight, and the reaction is followed by a hold time at reaction temperature of between 1 and 30 minutes.

8. The process of claim 7 wherein the reactant aldoxime is acetaldoxime.

9. The process of claim 7 wherein reaction is commenced at a temperature of between 0° C. and −2° C. and is lowered during reaction such that it is above the freezing point of the reaction mass and below −2° C.

10. The process of claim 9 wherein the reactant aldoxime is acetaldoxime.

References Cited

Noller: Chemistry of Organic Cmpds., 3rd (1965), p. 285, QD253 N65.

Piloty et al.: Berichte der deutschen chem. Ges., vol. 35, p. 3101ff (1902).

Wieland: Berichte der deutschen chem. Ges., vol. 40, 1676ff (1907).

LORRAINE A. WEINBERGER, Primary Examiner

E. J. GLEIMAN, Assistant Examiner